US011535328B2

United States Patent
Korenaga et al.

(10) Patent No.: US 11,535,328 B2
(45) Date of Patent: Dec. 27, 2022

(54) MEASUREMENT DEVICE AND PROGRAM (71) Applicant: MITSUBISHI HEAVY INDUSTRIES MACHINERY SYSTEMS, LTD., Kobe (JP)

(72) Inventors: Takeshi Korenaga, Tokyo (JP); Tomokazu Shimoda, Tokyo (JP); Kazuyoshi Kitajima, Tokyo (JP); Hiromichi Nakamoto, Tokyo (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 383 days.

(21) Appl. No.: 16/495,150

(22) PCT Filed: Mar. 30, 2017

(86) PCT No.: PCT/JP2017/013433
§ 371 (c)(1),
(2) Date: Sep. 18, 2019

(87) PCT Pub. No.: WO2018/179286
PCT Pub. Date: Oct. 4, 2018

(65) Prior Publication Data
US 2020/0018600 A1 Jan. 16, 2020

(51) Int. Cl.
*B62J 45/415* (2020.01)
*G01C 19/06* (2006.01)
(Continued)

(52) U.S. Cl.
CPC ......... *B62J 45/4151* (2020.02); *B62J 45/412* (2020.02); *B62J 45/414* (2020.02);
(Continued)

(58) Field of Classification Search
CPC .................................................. B62J 45/4152
See application file for complete search history.

(56) References Cited

U.S. PATENT DOCUMENTS

2002/0183958 A1* 12/2002 McCall ................. G01C 21/16
702/141
2006/0247854 A1* 11/2006 Esaki ..................... G01C 21/28
701/505
(Continued)

FOREIGN PATENT DOCUMENTS

JP  H0726770 U  5/1995
JP  H0995276 A  4/1997
(Continued)

OTHER PUBLICATIONS

International Search Report and Written Opinion of International Application No. PCT/JP2017/013433 dated Jun. 27, 2017; 12pp.

*Primary Examiner* — Khoi H Tran
*Assistant Examiner* — Tristan J Greiner
(74) *Attorney, Agent, or Firm* — Kanesaka Berner and Partners LLP (57) ABSTRACT This measurement device for measuring the angular velocity or acceleration of a two-wheel vehicle, is provided with a main detection unit which detects the three-axis angular velocity or three-axis acceleration, a support unit which can support the main detection unit on the body of the two-wheel vehicle, and a correction unit which cancels the lean of the body to the left and right in the main detection unit.

3 Claims, 9 Drawing Sheets

(51) Int. Cl.
  *G01C 21/16* (2006.01)
  *B62J 50/21* (2020.01)
  *B62J 45/412* (2020.01)
  *B62J 45/414* (2020.01)
(52) U.S. Cl.
  CPC ............ *B62J 50/21* (2020.02); *G01C 19/065* (2013.01); *G01C 21/16* (2013.01)

(56) References Cited

U.S. PATENT DOCUMENTS

2007/0045028 A1* 3/2007 Yamamoto ............... B62K 5/01
                                                            180/311
2011/0120220 A1* 5/2011 Jiang ..................... G01P 15/032
                                                            73/514.12
2016/0091620 A1   3/2016 Paros

FOREIGN PATENT DOCUMENTS

| | | | | |
|---|---|---|---|---|
| JP | 2001027666 A | | 1/2001 | |
| JP | 2008256648 A | * | 10/2008 | ............ B82Y 25/00 |
| JP | 2011112591 A | * | 6/2011 | |
| JP | 2011112591 A | | 6/2011 | |
| JP | 2013072781 A | | 4/2013 | |
| KR | 1020110073526 A | | 6/2011 | |

* cited by examiner

MEASUREMENT DEVICE AND PROGRAM

RELATED APPLICATIONS

The present application is a National Phase of International Application Number PCT/JP2017/013433 filed Mar. 30, 2017.

TECHNICAL FIELD

The present invention relates to a measurement device and a program.

BACKGROUND ART

At present, vehicle navigation systems, such as a vehicle navigation system that utilizes a global Navigation satellite system (GNSS), utilizes information on various sensors, such as mounted acceleration sensor and angular-velocity sensor, and performs positioning of a vehicle, are known.

As a technique related to this, PTL 1 discloses a technique in which a vehicle navigation system is mounted on a motorcycle.

CITATION LIST

Patent Literature

[PTL 1] Japanese Unexamined Patent Application Publication No. 9-95276

SUMMARY OF INVENTION

Technical Problem

However, compared to a four-wheel vehicle, the two-wheel vehicle is greatly tilted to the left and right, for example, when turning to the left and right, when turning a curve, or the like. Therefore, the tilt in the leftward-rightward direction is greatly different from the four-wheel vehicle. For this reason, if a vehicle navigation system made for the four-wheel vehicle is mounted on the two-wheel vehicle, the vehicle navigation system may be influenced by the tilt of the two-wheel vehicle.

Thus, an object of the invention is to provide a measurement device that is not easily influenced by the tilt of a two-wheel vehicle even if the measurement device is mounted on the two-wheel vehicle.

Solution to Problem

A measurement device of a first aspect is a measurement device (20, 20') that measures an angular velocity or an acceleration of a two-wheel vehicle (BK), the measurement device including a main detection unit (21) that detects a three-axis angular velocity or a three-axis acceleration; a support unit (22) capable of supporting the main detection unit on the body (BD) of the two-wheel vehicle; and a correction unit (23, 23') that cancels a tilt of the body in a leftward-rightward direction with respect to the main detection unit (21).

According to this aspect, the measurement device cancels the tilt of the body of the two-wheel vehicle in the leftward-rightward direction to detect the three-axis angular velocity acceleration or the three-axis angular velocity. Therefore, even if the two-wheel vehicle greatly tilts in the leftward-rightward direction, influence of the tilt of the two-wheel vehicle is suppressed. On the other hand, since the measurement device does not cancel the tilt in the forward-backward direction, the tilt in uphill traveling is not canceled.

Hence, the measurement device can detect the three-axis angular velocity or the three-axis acceleration of the two-wheel vehicle similarly to a four-wheel vehicle.

A measurement device of a second aspect is a measurement device of a second aspect in which the correction unit is a pendulum mechanism that is provided in the support unit to make the main detection unit oscillatable in the leftward-rightward direction with respect to the body.

According to this aspect, the measurement device cancels the tilt of the body of the two-wheel vehicle in the leftward-rightward direction by the pendulum mechanism.

For this reason, the same detection value as the four-wheel vehicle can be obtained without correcting the detection value.

A measurement device of a third aspect is the measurement device of the first or second aspect in which the correction unit includes a tilt detection unit (26) that detects the tilt, and a correction calculation unit (27c) that corrects a detection value detected by the main detection unit on the basis of the detected tilt.

According to this aspect, the detected detection value is corrected by calculation. For this reason, the same detection value as the four-wheel vehicle can be obtained without changing a mechanical structure.

A measurement device of a fourth aspect is the measurement device of any one of the first to third aspect in which the support unit includes a damping mechanism (24, 24') that damps a vibration from the body.

According to this aspect, since the vibration of the main detection unit is damped, noise of the detection value resulting from the vibration can be suppressed.

A program of a fifth aspect is a program for a computer of a measurement device that measures an angular velocity or an acceleration of a two-wheel vehicle, and includes a main detection unit that detects a three-axis angular velocity or a three-axis acceleration; a support unit capable of supporting the main detection unit on the body of the two-wheel vehicle; and a tilt detection unit that detects a tilt of the body in the leftward-rightward direction, the program causing the computer to function as a main detection acquisition unit (27a) that acquires a detection value detected by the main detection unit, a tilt acquisition unit (27b) that acquires a tilt detected by the tilt detection unit, and a correction calculation unit that corrects the detection value detected by the main detection unit on the basis of the detected tilt, and cancels the tilt of the body in a leftward-rightward direction.

Advantageous Effects of Invention

According to one aspect of the invention, the measurement device is not easily influenced by the tilt of the two-wheel vehicle even if the measurement device is mounted on the two-wheel vehicle.

DESCRIPTION OF EMBODIMENTS

Hereinafter, various embodiments related to the invention will be described with reference to the drawings.

First Embodiment

A first embodiment of a vehicle navigation system related to the invention will be described with reference to FIGS. 1 to 9.

(Entire Configuration)

An entire configuration of a vehicle navigation system 100 will be described.

Figure 1:
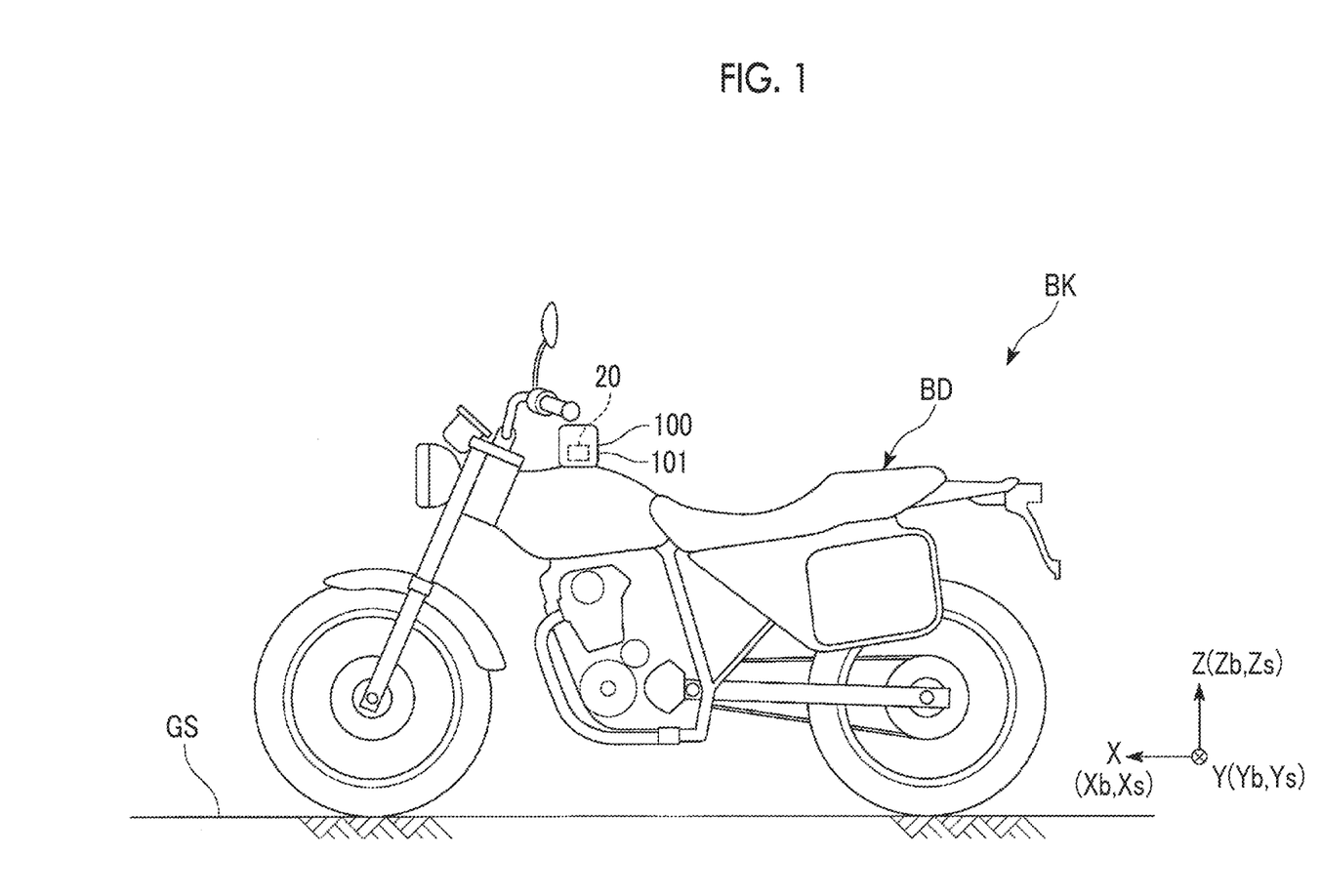
FIG. 1 is a schematic view of a vehicle navigation system related to a first embodiment of the invention.

As illustrated in FIG. 1, the vehicle navigation system 100 is fixed to a body BD of a two-wheel vehicle BK. In the present embodiment, the vehicle navigation system 100 is detachably fixed to the body BD of the two-wheel vehicle BK.

The vehicle navigation system 100 does not have restrictions in weight, shape, magnitude, and the like.

For example, the navigation system may be of a box type having the same shape and size as a battery of the two-wheel vehicle BK, or may be of a tablet type.

Additionally, the vehicle navigation system 100 may be installed on the body BD of the two-wheel vehicle BK, or may be portable.

Additionally, in the present embodiment, the vehicle navigation system 100 utilizes a global navigation satellite system (GNSS), uses autonomous navigation based on measurement information of a measurement device 20 to be described below in combination, and performs positioning of the two-wheel vehicle BK. Hence, irrespective of whether or not radio waves are received from GNSS satellites, the vehicle navigation system 100 performs the positioning of the two-wheel vehicle BK, sequentially acquires a current position, and performs driving support, driving analysis, and the like.

Hereinafter, an orthogonal system will be described.

In the present embodiment, three orthogonal systems of a road surface orthogonal system Qw, a body orthogonal system Qb, and a measurement orthogonal system Qs are defined.

The road surface orthogonal system Qw is an orthogonal system that has an XY plane as the road surface GS and is composed of an X-axis, a Y-axis, and a Z-axis. As illustrated in FIG. 1, in a case where the body BD of the two-wheel vehicle BK stands upright in the vertical direction without being tilted with respect to the road surface GS and travels in an X-axis normal direction, as the two-wheel vehicle BK is seen from the front, a leftward direction is a Y-axis normal direction, and an upward direction is a Z-axis normal direction.

The body orthogonal system Qb is an orthogonal system in that the road surface orthogonal system Qw is rotated in accordance with the tilt of the body BD of the two-wheel vehicle BK with respect to the road surface GS. The body orthogonal system Qb is composed of three axes of anXb-axis, aYb-axis, and a Zb-axis. The Xb-axis is associated with the X-axis, the Yb-axis is associated with the Y-axis, and the Zb-axis is associated with the Z-axis. A direction along the Xb-axis is also described as a forward-backward direction of the body BD.

The measurement orthogonal system Qs is an orthogonal system in that the road surface orthogonal system Qw is rotated in accordance with the tilt of a main detection unit 21 to be described below with respect to the road surface GS. The measurement orthogonal system Qs is composed of three axes of anXs-axis, a Ys-axis, and a Zs-axis. The Xs-axis is associated with the X axis, the Ys-axis is associated with the Y-axis, and the Zs-axis is associated with the Z-axis.

In the present embodiment, in a case where the two-wheel vehicle BK stands upright in the vertical direction without being tilted with respect to the road surface GS, the vehicle navigation system 100 is fixed to the body BD of the two-wheel vehicle BK such that the Xs-axis, the Ys-axis, and the Zs-axis coincide with the Xb-axis, the Yb-axis, and the Zb-axis, respectively.

The vehicle navigation system 100 includes the measurement device 20 and a housing 101. In the present embodiment, the measurement device 20 is provided within the housing 101.

Figure 2:
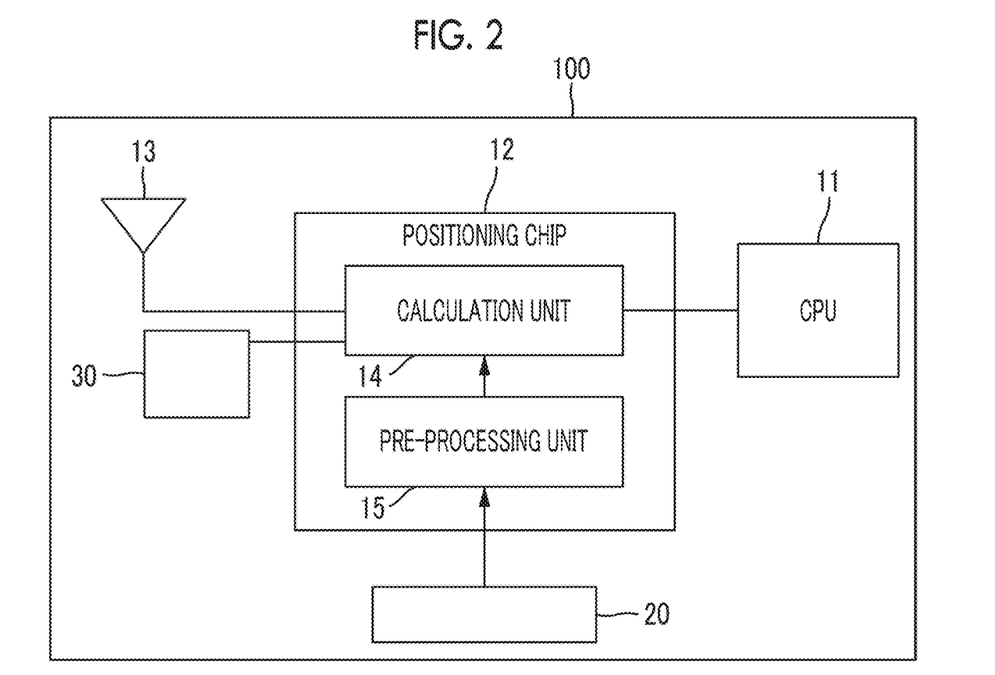
FIG. 2 is a block diagram of the vehicle navigation system related to the first embodiment of the invention.

As illustrated in FIG. 2, the vehicle navigation system 100 further include a CPU 11, a positioning chip 12, a GNSS antenna 13, and an acceleration sensor 30 within the housing 101.

The CPU 11 acquires positional information of the positioned two-wheel vehicle BK, and executes various applications for driving support, driving analysis, and the like.

The positioning chip 12 acquires the current position of the two-wheel vehicle BK on the basis of the radio waves and the various kinds of measurement information that are acquired from the GNSS antenna 13.

The acceleration sensor 30 is fixed within the housing 101, and acquires the three-axis acceleration of the body BD of the two-wheel vehicle BK as a detection value.

The GNSS antenna 13 acquires the radio waves from a plurality of GNSS satellites, and extracts GNSS signals by signal processing. The GNSS antenna 13 outputs the extracted GNSS signals to the positioning chip 12.

(Configuration of Positioning Chip)

The configuration of the positioning chip 12 will be described.

The positioning chip 12 includes a calculation unit 14 and a pre-processing unit 15.

The positioning chip 12 is communicably connected to CPU 11, and outputs the acquired various kinds of information and the positional information of the positioned two-wheel vehicle BK to the CPU 11.

Additionally, the positioning chip 12 is connected to the measurement device 20 so as to be capable of acquiring the detection value detected by the measurement device 20.

Moreover, the positioning chip 12 is connected to the acceleration sensor 30 so as to be capable of acquiring the detection value detected by the acceleration sensor 30.

The calculation unit 14 is connected to the GNSS antenna 13 so as to be capable of acquiring the radio waves received by the GNSS antenna 13. The calculation unit 14 calculates the current position of the two-wheel vehicle BK on the basis of the radio waves acquired from the GNSS antenna 13.

In the present embodiment, the calculation unit 14 obtains respective times until respective radio waves transmitted from the plurality of GNSS satellites reach the two-wheel vehicle BK from the acquired radio waves by signal processing. By obtaining distances to the respective GNSS satellites from the respective times, the calculation unit 14 obtains the latitude and longitude of the mounted two-wheel vehicle BK.

Additionally, the calculation unit 14 corrects the position of the two-wheel vehicle BK on the basis of the detection value detected by the acceleration sensor 30 and the detection value of the measurement device 20 acquired via the pre-processing unit 15. Accordingly, in a case where reception of the radio waves from the GNSS satellites is difficult under the ground, in tunnels, in the shadows of skyscrapers, and the like, the calculation unit 14 performs autonomous navigation (dead reckoning) utilizing the acceleration acquired by the acceleration sensor 30 and the angular velocity (to be described below) acquired by the measurement device 20.

In the present embodiment, the calculation unit 14 corrects the newest position acquired on the basis of the radio waves from the GNSS satellites with the acquired acceleration and angular velocity. Accordingly, the calculation unit 14 can estimate the current position even in a case where it is difficult to receive the radio waves from the GNSS satellites.

Hence, irrespective of whether or not radio waves are received from the GNSS satellites, the vehicle navigation system 100 performs the positioning of the two-wheel vehicle BK, sequentially acquires the current position of the two-wheel vehicle BK, and performs driving support, driving analysis, and the like.

The pre-processing unit 15 performs low pass filter processing and correction calculation on the detection value acquired from the measurement device 20.

The measurement device 20 is provided in the housing 101 of the vehicle navigation system 100 to measure angular velocity. The measurement device 20 calculates a rotational angle by integrating the angular velocity once. The calculated rotational angle is utilized for the calculation of the positional information of the two-wheel vehicle BK.

(Configuration of Measurement Device)

A detailed configuration of the measurement device 20 will be described.

Figure 3:
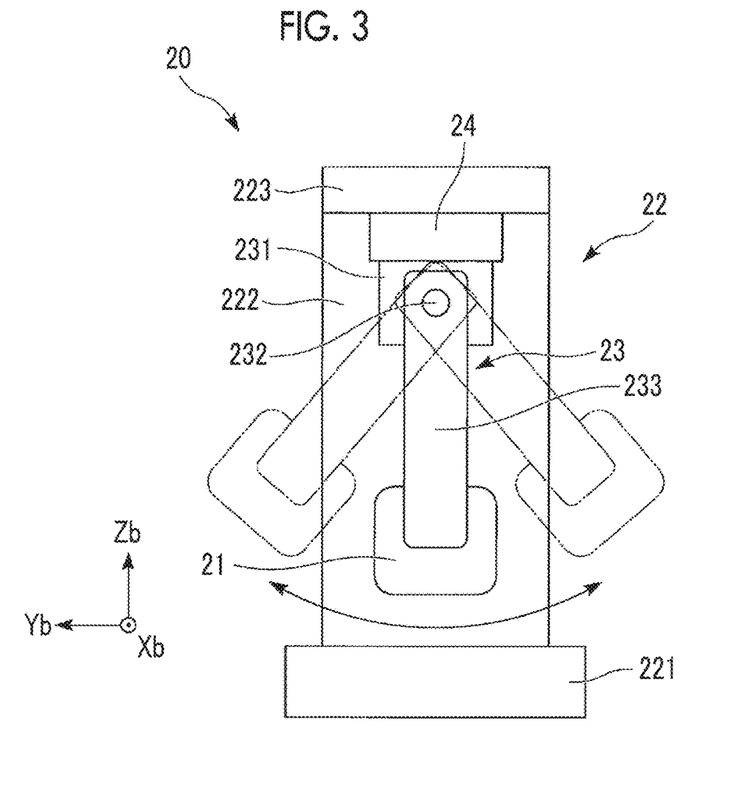
FIG. 3 is a front view of a measurement device related to the first embodiment of the invention.

As illustrated in FIG. 3, the measurement device 20 includes a main detection unit 21 that detects a three-axis angular velocity, a support unit 22 that supports the main detection unit 21 with respect to the body BD of the two-wheel vehicle BK, a correction unit 23 that cancels the tilt of the body BD in a leftward-rightward direction with respect to the main detection unit 21, and a damping mechanism 24. Here the "tilt of the body BD in the leftward-rightward direction" means the tilt of the body BD of the two-wheel vehicle BK with respect to the vertical direction within a YZ plane.

The main detection unit 21 has a gyro sensor, and measures angular velocities in respective directions of an Xs-axis direction, a Ys-axis direction, and a Zs-axis direction that are directions along three axes of the measurement orthogonal system Qs.

The support unit 22 is capable of supporting the main detection unit 21 with respect to the body BD of the two-wheel vehicle BK.

In the present embodiment, the vehicle navigation system 100 is fixed to the body BD of the two-wheel vehicle BK. For this reason, the support unit 22 is fixed to the body BD of the two-wheel vehicle BK, and supports the main detection unit 21 with respect to the body BD of the two-wheel vehicle BK.

As illustrated in FIG. 3, in the present embodiment, the main detection unit 21 is supported on the support unit 22 via the correction unit 23 and the damping mechanism 24.

Figure 4:
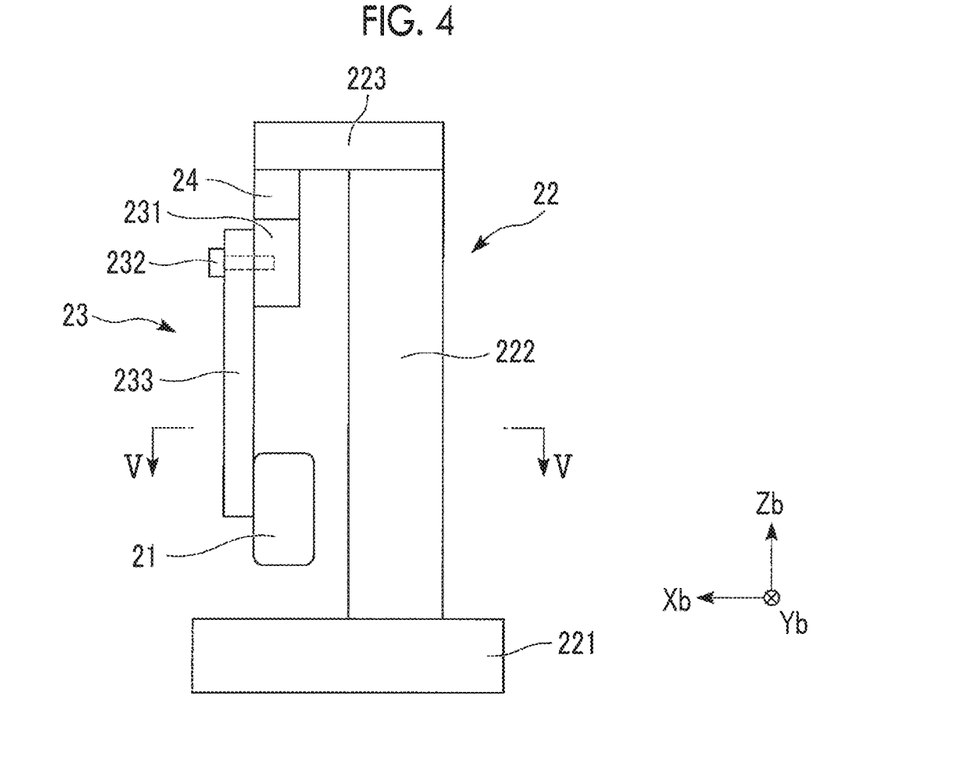
FIG. 4 is a side view of the measurement device related to the first embodiment of the invention.
Figure 5:
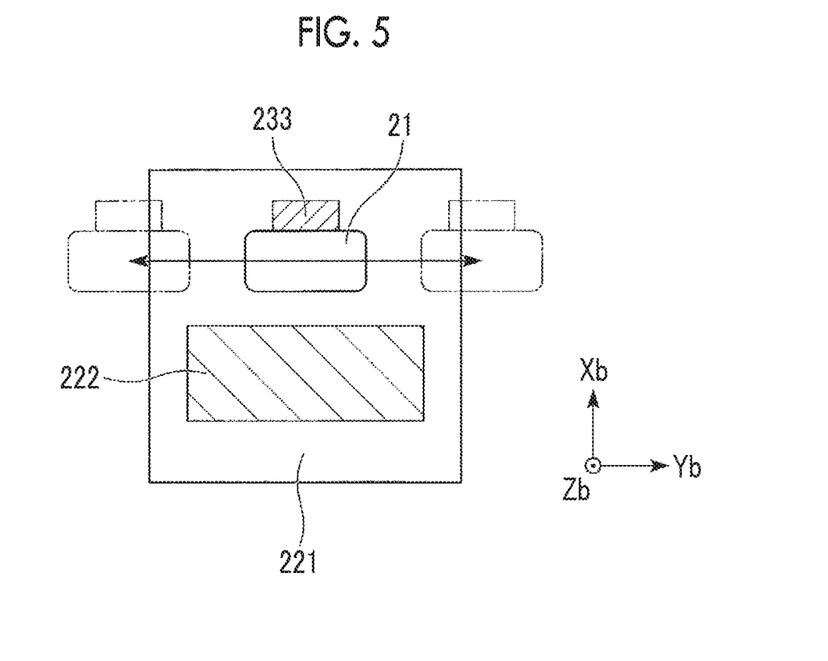
FIG. 5 is a sectional view taken along line V-V in FIG. 4.

As illustrated in FIGS. 3 to 5, the support unit 22 includes an attachment part 221, a column part 222, and a beam part 223.

The support unit 22 is fixed to the housing 101 in the attachment part 221.

The column part 222 is a member that has a column structure that extends in an upward direction from the attachment part 221, and supports the beam part 223 at an upper end thereof.

As illustrated in FIG. 4, the beam part 223 is a member of a beam structure that extends in a forward direction from the column part. The beam part 223 suspends the main detection unit 21 in a vertically downward direction via the damping mechanism 24 and the correction unit 23.

The correction unit 23 includes a base part 231, a shaft part 232, and an arm part 233.

The measurement device 20 is fixed to the correction unit 23.

The arm part 233 is a member that has a rod structure that extends from the shaft part 232 toward the measurement device 20.

The shaft part 232, which extends in an Xb direction from the base part 231, passes through one end of the arm part 233. Accordingly, the arm part 233 is fixed to the base part 231 so as to be oscillatable in a leftward-rightward direction.

The measurement device 20 is fixed to the other end of the arm part 233.

Since the arm part 233 is oscillatable in the leftward-rightward direction, the measurement device 20 is suspended in a vertically downward direction with respect to the shaft part 232 irrespective of the tilt to the leftward-rightward direction of the body BD in the two-wheel vehicle BK that is stationary with respect to the road surface GS.

The "oscillation in the leftward-rightward direction" is oscillation that has the shaft part 232 as an oscillation axis, and is oscillation within aYbZb plane. Here, aYbZb plane is a plane along the Yb-axis and the Zb-axis.

Hence, as illustrated in FIGS. 3 and 5, the correction unit 23 is configured so as to be oscillated only in the leftward-rightward direction by a pendulum mechanism and cancel the tilt of the main detection unit 21 resulting from the tilt of the body BD of the two-wheel vehicle BK in the leftward-rightward direction.

The damping mechanism 24 is configured so as to damp the vibration from the body BD and such that the vibration from the body BD is not detected as vibration noise by the measurement device 20.

Figure 6:
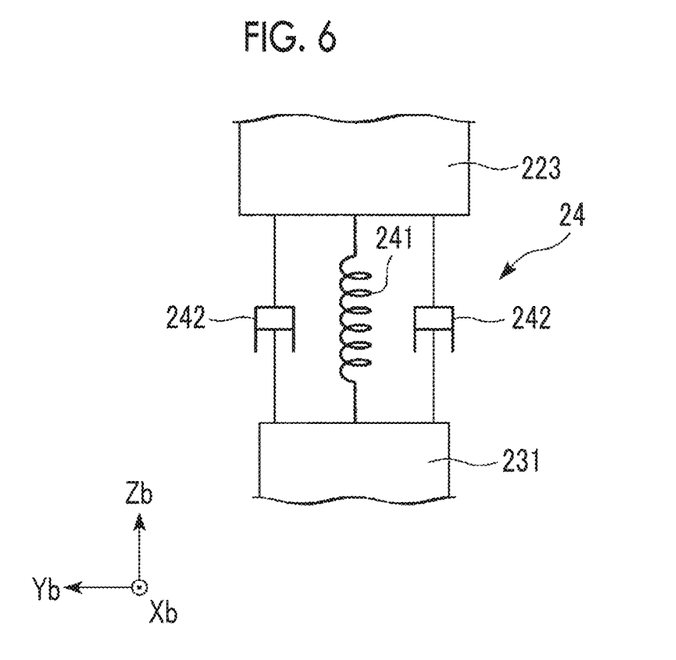
FIG. 6 is a schematic view of a damping mechanism related to the first embodiment of the invention.

In the present embodiment, as illustrated in FIG. 6, the damping mechanism 24 includes a spring 241 and two dampers 242 provided on both left and right sides of the spring 241. An upper end of the damping mechanism 24 is fixed to the beam part 223 of the support unit 22, and the base part 231 of the correction unit 23 is fixed to a lower end of the damping mechanism 24. Accordingly, the damping mechanism 24 damps vibration with the dampers 242 while responding to the vibration with the spring 241.

(Function and Effect)

Functions and effects of the present embodiment will be described.

Figure 7:
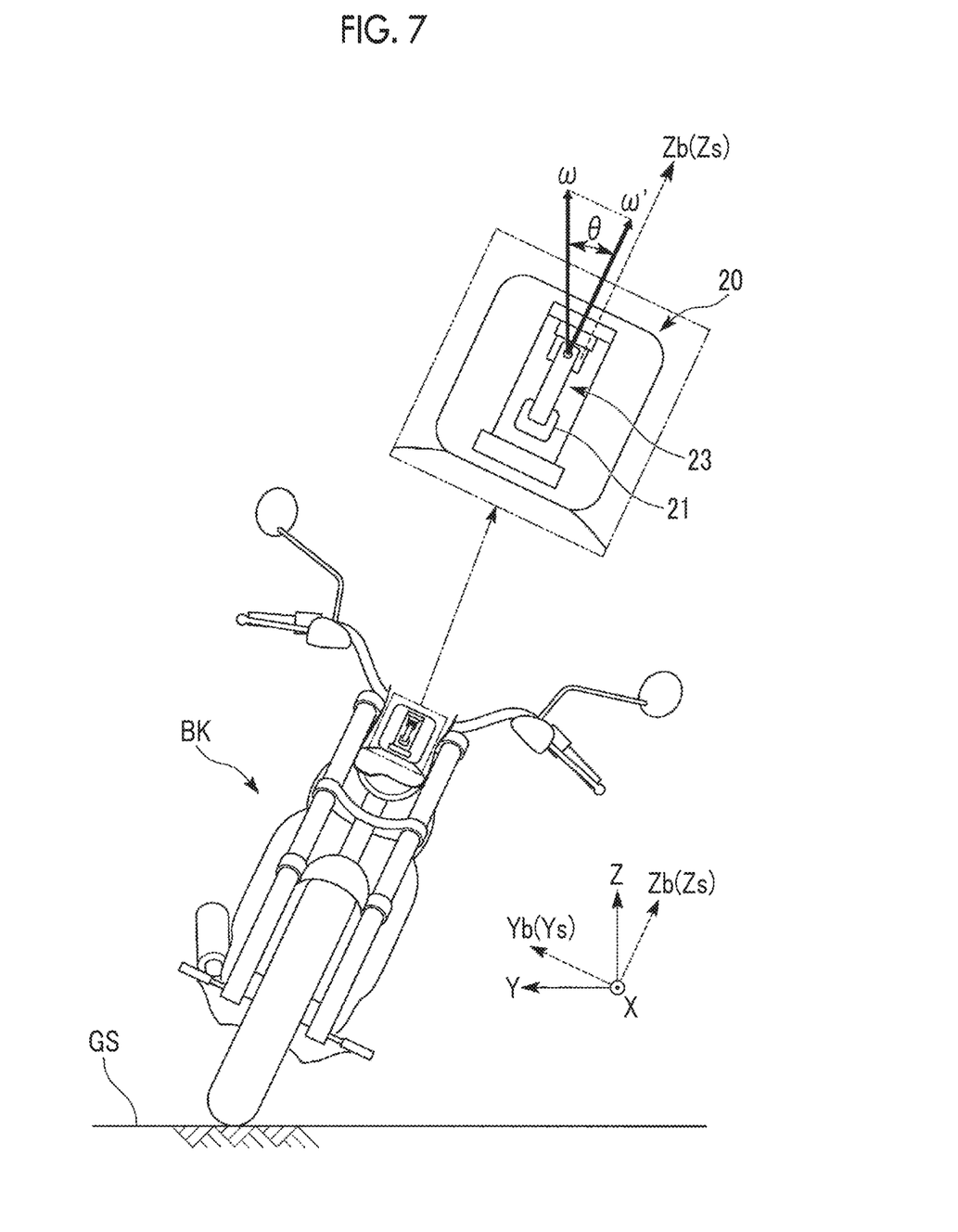
FIG. 7 is a view illustrating the movement of a measurement device in a reference example.

First, the present embodiment is compared with a case (reference example) where the correction unit 23 does not oscillate in the leftward-rightward direction.

A case where the body BD of the two-wheel vehicle BK is turned at an angular velocity ω with respect to the road surface GS while being tilted at an angle θ with respect to the Z-axis to the right side as the two-wheel vehicle BK is seen from the front will be described.

As illustrated in FIG. 7, in a case where the correction unit 23 does not oscillate in the leftward-rightward direction, the main detection unit 21 is tilted at the angle θ along with the tilt of the body BD of the two-wheel vehicle BK, and the measurement orthogonal system Qs is also tilted at the angle θ long with the tilt of the body BD. As a result, the main detection unit 21 cannot detect a turning angular velocity only with a magnitude (=ω cos θ) obtained by projecting an actual angular velocity ω on the Zb-axis of the measurement orthogonal system Qs.

Figure 8:
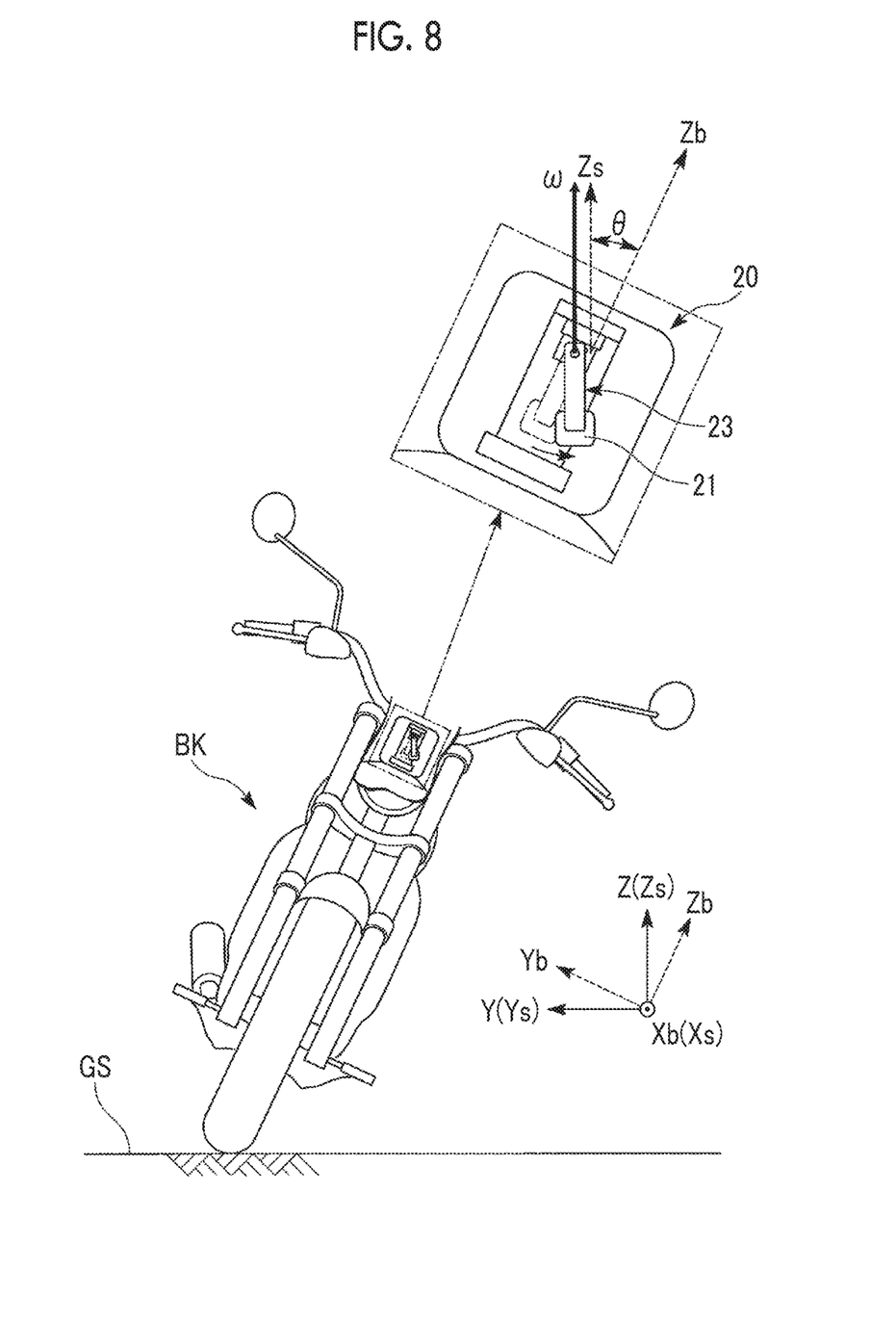
FIG. 8 is a view illustrating the movement of the measurement device related to the first embodiment of the invention.

In contrast, as illustrated in FIG. 8, in a case where the correction unit 23 oscillates in the leftward-rightward direction as in the present embodiment, the measurement device 20 cancels the tilt of the main detection unit 21 with the oscillation of the correction unit 23. For this reason, the measurement orthogonal system Qs does not rotate with respect to the road surface orthogonal system Qw, and the main detection unit 21 can detect the actual turning angular velocity ω.

In a case where the two-wheel vehicle BK travels along a curve, a centrifugal force also further acts on the main detection unit 21. For this reason, even in a case where the correction unit 23 oscillates in the leftward-rightward direction, the tilt of the main detection unit 21 is not completely canceled, and the main detection unit 21 is somewhat tilted in the same direction as the tilt of the body BD of the two-wheel vehicle BK due to the centrifugal force.

However, the tilt of the main detection unit 21 is further suppressed in a case where the correction unit 23 oscillates than in a case where the correction unit 23 does not oscillate, a value close to the actual turning angular velocity ω can be detected.

Figure 9:
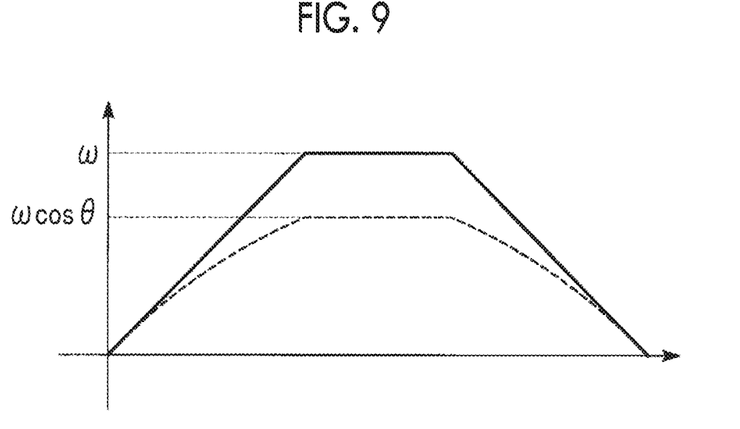
FIG. 9 is a graph illustrating the angular velocity to be measured.

FIG. 9 illustrates changes in turning angular velocity detected from the start of turn to the end of the turn in the two-wheel vehicle BK that turns at the turning angular velocity ω. A solid line indicates the case of the present embodiment and a broken line indicates the case of the reference example. A vertical axis is the turning angular velocity detected by the main detection unit, and a horizontal axis is time.

As illustrated in FIG. 9, as the turning angular velocity, ω cos θ is detected in the reference example, whereas ω is detected in the present embodiment.

In this way, the measurement device 20 cancels the tilt of the body BD in the leftward-rightward direction to detect the three-axis angular velocity. Therefore, even if the two-wheel vehicle BK greatly tilts in the leftward-rightward direction of the body BD, influence of the tilt of the two-wheel vehicle BK is suppressed in the measurement device 20.

Additionally, the measurement device 20 cancels the tilt of the body BD in the leftward-rightward direction by the pendulum mechanism. For this reason, the measurement device 20 can obtain the same detection value as the four-wheel vehicle without correcting the detection value.

On the other hand, since the measurement device 20 does not cancel the tilt of the body BD in the forward-backward direction, the tilt in uphill traveling is not canceled. For this reason, the measurement device 20 can detect the tilt of the body BD in the forward-backward direction similarly to the four-wheel vehicle.

If the same detection value as the four-wheel vehicle can be obtained from the measurement device 20, the output of the measurement device 20 can be utilized for the vehicle navigation system of the four-wheel vehicle.

For example, as calculation processing for positional information to be executed by CPU 11, and various applications for driving support, driving analysis, and the like, calculation processing and various applications for the four-wheel vehicle can be utilized as they are.

Second Embodiment

A second embodiment of a vehicle navigation system related to the invention will be described with reference to FIGS. 10 to 12.

Although the vehicle navigation system of the present embodiment is basically the same as the first embodiment, the present embodiment is different from the first embodiment in that the correction unit does not perform the correction by the pendulum mechanism but performs the correction by the tilt detected by the tilt detection unit. Differences will be described in detail below.

An entire configuration of a vehicle navigation system 100' will be described.

Figure 10:
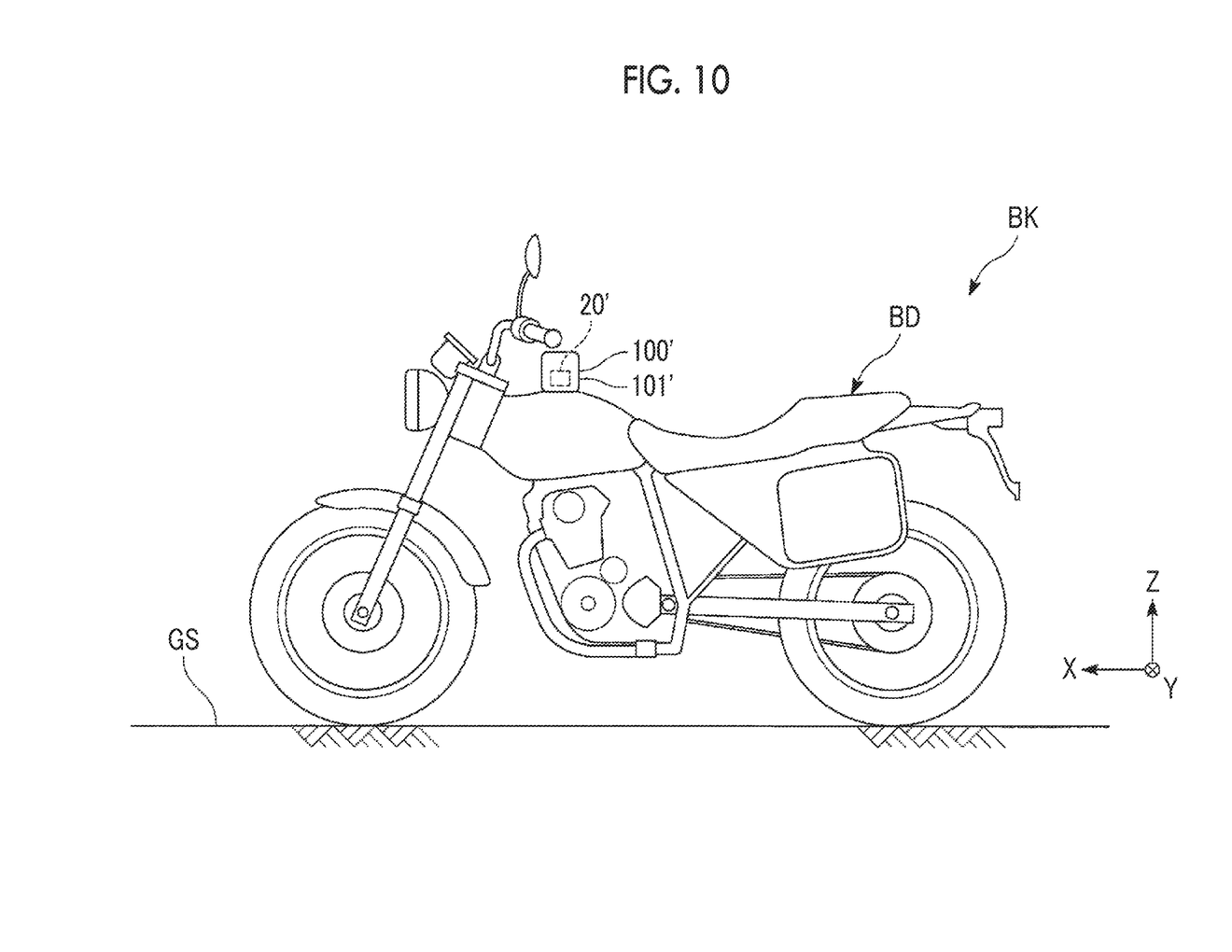
FIG. 10 is a schematic view of a vehicle navigation system related to a second embodiment of the invention.

As illustrated in FIG. 10, the vehicle navigation system 100' is fixed to the body BD of the two-wheel vehicle BK. In the present embodiment, the vehicle navigation system 100' is detachably fixed to the body BD of the two-wheel vehicle BK.

The vehicle navigation system 100' includes a measurement device 20' and a housing 101'. In the present embodiment, the measurement device 20' is provided within the housing 101'.

Figure 11:
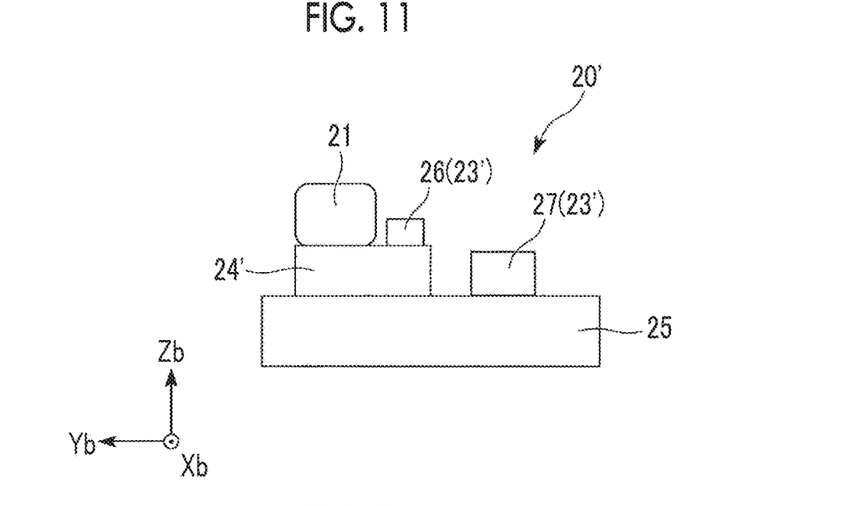
FIG. 11 is a schematic view of a measurement device related to the second embodiment of the invention.

As illustrated in FIG. 11, the measurement device 20' includes the main detection unit 21 that detects the three-axis angular velocity, a correction unit 23' that cancels the tilt of the body BD in the leftward-rightward direction with respect to the output of the main detection unit 21, a damping mechanism 24', and an attachment stand 25.

The correction unit 23' includes a tilt detection unit 26 and a correction processing unit 27.

The main detection unit 21 and the tilt detection unit 26 are fixed to the housing 101' via the damping mechanism 24' and the attachment stand 25. The correction processing unit 27 is fixed to the housing 101' via the attachment stand 25.

The damping mechanism 24' is configured so as to damp the vibration from the body BD of the two-wheel vehicle BK and such that the vibration from the body BD is not detected by the main detection unit 21 and the tilt detection unit 26.

The tilt detection unit 26 detects the tilt of the body BD in the leftward-rightward direction.

Figure 12:
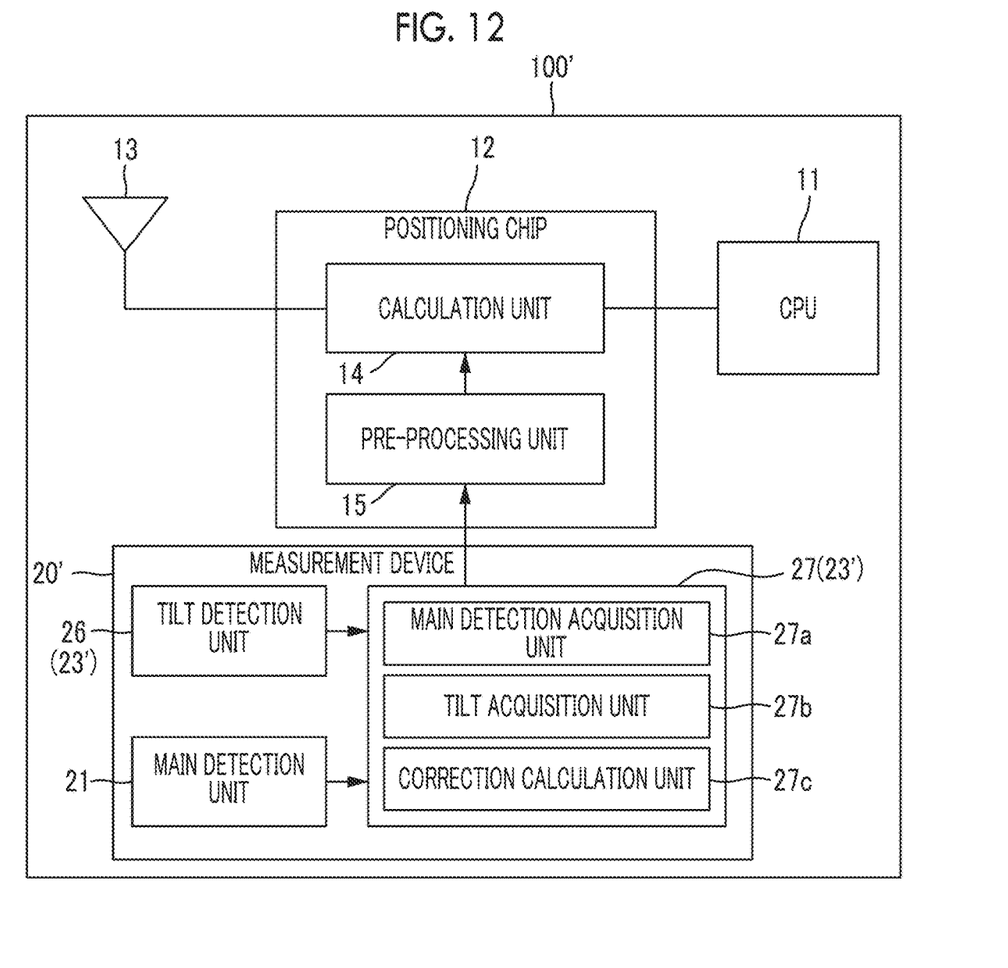
FIG. 12 is a block diagram of the vehicle navigation system related to the second embodiment of the invention.

As illustrated in FIG. 12, the correction processing unit 27 includes a main detection acquisition unit 27a, a tilt acquisition unit 27b, and a correction calculation unit 27c.

The main detection acquisition unit 27a acquires a detection value detected by the main detection unit 21.

The tilt acquisition unit 27b acquires a tilt detected by the tilt detection unit 26.

The correction calculation unit 27c corrects a detection value detected by the main detection acquisition unit 27a on the basis of the tilt acquired by the tilt acquisition unit 27b.

In the present embodiment, by executing a program to be described below, a computer is made to function as the main detection acquisition unit 27a, the tilt acquisition unit 27b, and the correction calculation unit 27c.

For example, in a case where the main detection unit 21 detects a turning angular velocity ω' as the detection value and the tilt detection unit 26 detects θ as the tilt, the correction calculation unit 27c calculates ω=ω'/cos θ to correct the turning angular velocity ω' to the turning angular velocity ω.

The correction calculation unit 27c outputs the corrected turning angular velocity ω to the calculation unit 14 via the pre-processing unit 15 as the detection value.

The measurement device 20' corrects the detection value detected by the main detection unit 21 by calculation. For this reason, the same detection value as the four-wheel vehicle can be obtained without changing a mechanical structure.

Hence, similarly to the first embodiment, since the same detection value as the four-wheel vehicle can be obtained from the measurement device 20', the output of the measurement device 20' can be utilized for the vehicle navigation system of the four-wheel vehicle.

Modification Example

Modification examples of the above respective embodiments will be described below.

In the above respective embodiments, the main detection unit 21 detects the three-axis angular velocity. However, as a modification example, the main detection unit 21 may have an acceleration sensor, and may detect a three-axis acceleration. In this case, the main detection unit 21 cancels the tilt of the body BD of the two-wheel vehicle BK in the leftward-rightward direction, and detects the three-axis acceleration. For this reason, even if the two-wheel vehicle BK is greatly tilted to the left and right, the main detection unit 21 can detect the acceleration of an axis of that the influence of the tilt of the two-wheel vehicle BK is suppressed.

The vehicle navigation system integrates the detected acceleration once to calculate a speed. Moreover, the vehicle navigation system integrates the detected acceleration twice to calculate a distance. The speed and the distance that are calculated are utilized for the calculation of the positional information of the two-wheel vehicle BK.

Moreover, as another modification example, the main detection unit 21 may be a combination of the detection of the three-axis angular velocity and the detection of the three-axis acceleration.

That is, the measurement device may be a measurement device that measures at least one of the angular velocity and the acceleration of the two-wheel vehicle BK.

In the above respective embodiments, the measurement device is provided within the housing of the vehicle navigation system. However, as a modification example, the measurement device may be provided outside the housing of the vehicle navigation system.

As another modification example, the measurement device may be separated from the vehicle navigation system and may be separately provided.

For example, the vehicle navigation system is provided on a handlebar of the two-wheel vehicle BK, and the measurement device may be provided on a fuel tank of the two-wheel vehicle BK.

In a case where the measurement device is separated from the vehicle navigation system, the measurement device and the vehicle navigation system are connected to each other by a wired or wireless communication line for delivery of a detection value.

The damping mechanisms of the above respective embodiments include the spring and the damper. However, any mechanism that damps vibration while responding to the vibration may be used. As a modification example, the damping mechanism may include an air spring. The air spring has a function of damping vibration while responding to the vibration. For this reason, the damping mechanism is configured by a small number of parts by using the air spring.

In addition, in the second embodiment, programs for realizing the functions of the correction processing unit 27 of the measurement device 20' are recorded on computer-readable recording media, and a computer system is made to read in and execute the programs recorded on the recording media. Here, processes of processing of the CPU of the computer system are stored in the computer-readable recording media in the form of the programs, and the above processing is performed as the computer reads and executes the programs. Additionally, the computer-readable recording media means a magnetic disc, a magneto-optical disc, a CD-ROM, a DVD-ROM, a semiconductor memory, and the like. Additionally, these computer programs may be distributed to the computer by communication lines, and the computer that has received this distribution may be made to execute the programs.

Although the several embodiments of the invention have been described above, these embodiments are merely illustrative examples and are not intended to limit the scope of the invention. These embodiments can be carried out in other various forms, and various omissions, substitutions, and alternations can be performed without departing from the spirit of the invention. These embodiments and their modifications are embraced in the scope of the invention and its equivalent as defined in the claims, similar to being embraced in the scope and spirit of the invention.

For example, the vehicle navigation system may include a display, a touch panel, a camera, and the like.

Additionally, the vehicle navigation system may include a geomagnetic sensor.

INDUSTRIAL APPLICABILITY

The measurement device of the invention is not easily influenced by the tilt of the two-wheel vehicle even if the measurement device is mounted on the two-wheel vehicle.

The invention claimed is:

1. A measurement device that measures an angular velocity or an acceleration of a two-wheel vehicle, the measurement device comprising:
   a main sensor configured to detect a three-axis angular velocity or a three-axis acceleration;
   a unit that cancels a tilt of a body of the two-wheel vehicle in a leftward-rightward direction of the body with respect to the main sensor, and does not cancel a tilt of the body in a forward-backward direction of the body with respect to the main sensor, and
   a beam that is configured to support the main sensor on the body and suspends the main sensor via the unit, wherein
      the unit comprises a base, a shaft and an arm,
      the shaft extends from the base in the forward-backward direction, and
      the arm is configured to oscillate around the shaft as an oscillation axis and suspends the main sensor.

2. The measurement device according to claim 1,
wherein the unit includes a pendulum that makes the main sensor oscillatable in the leftward-rightward direction with respect to the body.

3. The measurement device according to claim 1, wherein the measurement device includes a damper that damps a vibration from the body, and
the beam suspends the main sensor via the damper.

* * * * *